(12) United States Patent
Klekamp et al.

(10) Patent No.: US 6,678,454 B2
(45) Date of Patent: Jan. 13, 2004

(54) BIREFRINGENCE-FREE PASSIVE OPTICAL COMPONENT

(75) Inventors: Axel Klekamp, Markgröningen (DE); Wiltraud Wischmann, Markgröningen (DE); Arnd Kilian, Berlin (DE)

(73) Assignee: Alcatel, Paris (FR)

( * ) Notice: Subject to any disclaimer, the term of this patent is extended or adjusted under 35 U.S.C. 154(b) by 184 days.

(21) Appl. No.: 09/933,731

(22) Filed: Aug. 22, 2001

(65) Prior Publication Data

US 2002/0039474 A1 Apr. 4, 2002

(30) Foreign Application Priority Data

Aug. 23, 2000 (DE) .......................................... 100 41 174

(51) Int. Cl.$^7$ ................................................ G02B 6/10
(52) U.S. Cl. ....................................................... 385/132
(58) Field of Search ........................ 385/132, 123–128, 385/142, 144; 372/6; 257/12, 13, 22, 94, 96, 103, 97

(56) References Cited

U.S. PATENT DOCUMENTS

| 4,929,302 A | 5/1990 | Valette |
| 5,303,319 A | 4/1994 | Ford et al. |
| 5,832,163 A | 11/1998 | Hollister |
| 6,172,382 B1 * | 1/2001 | Nagahama et al. ............ 257/94 |
| 6,229,150 B1 * | 5/2001 | Takayama et al. ............ 257/12 |

FOREIGN PATENT DOCUMENTS

| JP | 07056040 A | 3/1995 |
| JP | 08292336 A | 11/1996 |
| JP | 09080247 A | 3/1997 |

OTHER PUBLICATIONS

S. Suzuki et al, "Polarisation–insensitive arrayed–waveguide grating multiplexer with $SiO_2$–on–$SiO_2$ structure", Electronics Letters, Apr. 14, 1981, vol. 30, No. 8, pp. 642 and 643.

E. Wildermuth et al, "Penalty–free polarisation compensation of $SiO_2$/Si arrayed waveguide grating wavelength multiplexers using stress release grooves", Electronics Letters, Aug. 20, 1998, vol. 34, No. 17, pp. 1661–1662.

S. Suzuki et al Polarisation–insensitive arrayed–waveguide gratings using dopant–rich silica–based glass with thermal expansion adjusted to Si substrate:, Electronics Letters, Jun. 19, 1997, vol. 33, No. 13. pp. 1173–1174.

Simple method of fabricating polarisation–insensitive and very low crosstalk A W G grating devices, Electronics Letters, 8$^{th}$ Jan. 1998, vol. 34, No. pp. 78–79.

Birefringence Free Planar Optical Waveguide Made by Flame Hydrolysios Deposition (FHD) Through Tailoring of the Overcladding, Journal of Lightwave Technology, vol. 18, No. 2, Feb. 2000, pp. 193–198.

R. Zengerle et al, "Low–Loss Fibre–Chip Coupling by Buried Laterally Tapered InP/InGaAs/P Waveguide Structure", Electronics Letters, Mar. 26, 19982, vol. 28, No. 7, pp. 631–632.

* cited by examiner

Primary Examiner—Jean F. Duverne
(74) Attorney, Agent, or Firm—Kenta Suzue; Wilson Sonsini Goodrich & Rosati

(57) ABSTRACT

The production of optical waveguides on waveguide bases which, for example, are formed from a correspondingly structured buffer layer, reduces the birefringence which occurs owing to thermally induced stresses during the glass production process. Therefore, the concentration of dopants (for example boron atoms) in the cladding layer can be reduced to achieve a birefringence-free optical component as complete adaptation of the thermal coefficient of expansion of the glass to that of the silicon substrate is no longer necessary. This has the enormous advantage that optical components, which comprise optical waveguides of this type, remain stable relative to external influences for a long time.

14 Claims, 3 Drawing Sheets

BIREFRINGENCE-FREE PASSIVE OPTICAL COMPONENT

BACKGROUND OF THE INVENTION

The invention relates to an optical waveguide which is structured in a core layer which is located on a buffer layer and is covered by a cladding layer, the buffer layer being applied to a substrate, an optical component which is constructed on a substrate and is provided at least partially with a cladding layer and to two processes for producing a waveguide of this type according.

The invention is based on a priority application DE 100 41 174.6 which is hereby incorporated by reference.

SUMMARY OF THE INVENTION

Optical glass waveguides which are used in optical components such as an arrayed waveguide grading (AWG), a directional coupler or a star coupler, are produced by structuring a core layer doped, for example, with boron, phosphorus or germanium. This core layer is applied to a buffer layer. The latter consists, for example, of silicate ($SiO_2$) and is grown by oxidation under high-pressure steam on a silicon substrate (Si). This buffer layer serves to insulate the core layer from the silicon substrate which has a very high refractive index. The optical waveguides are structured, for example, by dry etching into the core layer and are then covered by a cladding layer several $\mu$m thick and made of silicate glass doped with boron, phosphorus or germanium.

Planar optical waveguides of this type in silicate glass have many applications in optical components for telecommunications. Generally however, these glass layers and therefore the optical components produced therefrom are not birefringence-free. This leads to uncontrollable polarisation-dependent losses in optical systems which are unacceptable when perfect operation is required.

In the meantime it has become known that the birefringence in the optical waveguide, which causes the TE-wave (electrical transversal component of the electromagnetic wave) of the optical signal to spread at a different speed in the waveguide compared with the TM-wave (magnetic transversal component of the electromagnetic wave), can be attributed to the use of silicon as substrate. The various thermal coefficients of expansion of glass layer and substrate material generally lead in the high temperature processes of glass production to thermally induced stresses in the glass layer which lead to birefringence.

The use of a glass substrate ($SiO_2$) instead of silicon allows the stress and therefore the birefringence to be reduced but it is still too high for practical applications (S. Suzuki, Y. Inoue and Y. Ohmori, Elect. Lett., Vol. 30, No. 8 (1994), pp. 642–643). A process is also known in which in a plurality of additional process steps grooves are subsequently etched into the finished optical component to compensate for the stresses (E. Wildermuth et al, Electronics Lett., Vol. 34, No. 17 (1998), pp. 1661–1662).

Here, however, a process is aspired to in which the birefringence is already compensated during production of the glass layers and waveguides without additional process steps. Based on the publications by S. Suzuki et al, Electronics Lett., Vol. 33, No. 13, pp. 1173–1174 and S. M. Ojha et al, Electr. Lett., 34(1), (1998), pp. 78, a process is described in the article by Kilian et al, J. Lightw. Technol. Vol. 18(2), (2000), pp. 193 for producing birefringence-free planar optical waveguides. The process is based on the use of flame hydrolysis deposition (FHD) to cover the waveguides with a cladding layer. In this case, the cladding layer consists of highly doped silicate glass $SiO_2$. Boron and phosphorus, for example, are used as dopants to adjust the refractive index. The quantity of boron atoms used allows the thermal expansion of the cladding layer to be increased such that cladding layer and silicon substrate have approximately the same thermal coefficient of expansion. It could be shown that optical waveguides have birefringence-free properties when the thermal coefficients of expansion of the cladding layer and of the substrate are the same.

This result was calculated with the aid of stress and mode simulation and is shown in FIG. 1. FIG. 1 shows the effective refractive indices of the TE-mode and TM-mode and the resulting birefringence (difference in the mode indices $n_{TE}-n_{TM}$) versus the thermal coefficient of expansion of the cladding layer. With a thermal coefficient of expansion of the cladding layer of $3.65 \times 10^{-6}$ $K^{-1}$, which almost corresponds to the value of the thermal coefficient of expansion of the silicon substrate of $3.6 \times 10^{-6}$ $K^{-1}$, the resulting birefringence is zero.

The quantity of boron atoms used as dopant in this case in order to achieve a birefringence-free waveguide leads to sensitivity to moisture in the doped cladding layer. As a result, optical modules which are provided with a cladding layer of this type are unstable with respect to moisture and this can even lead to destruction of the cladding layer (crystallising out) and therefore of the entire optical component. A solution to this is provided if an additional protective layer is applied to the cladding layer, but moisture can still attack the cladding layer at the edges of such optical modules.

The invention is based on the object of producing optical waveguides integrated in optical modules which have a birefringence which is as low as possible, this property of birefringence and the component's stability to moisture enduring over a long period.

The object is achieved according to the invention by an optical waveguide which is structured in a core layer which is located on a buffer layer and is covered by a cladding layer, the buffer layer being applied to a substrate, wherein a strip-shaped waveguide base of thickness d is formed between buffer layer and optical waveguide, which waveguide base is completely covered laterally by the cladding layer and has the optical waveguide structured thereon, and the cladding layer consists of a vitreous material doped with foreign atoms to impart a birefringence-free property to the optical waveguide, an optical component which is constructed on a substrate and is provided at least partially with a cladding layer, wherein the optical component has an optical waveguide as described above and by a process for producing an optical waveguide in which a buffer layer is applied to a substrate, to which buffer layer a core layer is applied, the optical waveguide being structured into the core layer, wherein a strip-shaped waveguide base of thickness d is formed from the buffer layer below the optical waveguide, and in that subsequently both the optical waveguide and the portion of the waveguide base not covered by the waveguide is covered by a cladding layer and a process for producing an optical waveguide in which a first buffer layer is applied to a substrate, to which first buffer layer a core layer is applied, the optical waveguide being structured into the core layer, wherein a further buffer layer is applied to the first buffer layer before the core layer is applied, from which further buffer layer a strip-shaped waveguide base of thickness d is formed, and in that subsequently both the optical waveguide and the portion of the waveguide base not covered by the waveguide is covered by a cladding layer.

Application of an optical waveguide along a strip-shaped structured buffer layer, formed as a waveguide base, allows a reduction in the thermal coefficient of expansion of the cladding layer with simultaneous birefringence-compensated waveguide. Accordingly, the quantity of dopants (for example boron atoms) no longer has to be so large for the cladding layer. This has the enormous advantage that optical components which comprise optical waveguides of this type remain birefringence-free for a long period for optical signals transmitted in the optical waveguides, and the cladding layer is moisture resistant.

The invention minimises in a simple manner the negative effects produced by the difference between the coefficients of expansion of the substrate and the waveguide. In the ideal case it is sufficient for this purpose to provide a waveguide base of a certain thickness. A suitable cladding layer is also advantageously selected, for example in a doped cladding layer the doping is appropriately selected to optimise the minimisation. Silicon, quartz glass, ceramic or a polymer, for example, can be used as substrate. An optical material, an amorphous optical material, glass or a primer for example is used as cladding layer. An optical material, an amorphous optical material, glass or a polymer for example is used as waveguide. An optical material, an amorphous optical material, glass or a polymer for example is used as buffer layer. The waveguide base is formed in one configuration from the buffer layer already formed, for example by etching. The waveguide base is accordingly made of the same material as the buffer layer.

BRIEF DESCRIPTION OF THE DRAWINGS

Advantageous configurations of the inventions emerge from the dependent claims, the following description and the drawings. Two embodiments of the invention will now be described with the aid of FIGS. 1 to 5, in which:

The first embodiment will now be described with the aid of FIGS. 1 to 4. As known in the state of the art up until now and as can clearly be seen from the graph in FIG. 1, freedom from birefringence can only be achieved in optical waveguides which are constructed on a silicon substrate if the coefficient of expansion of the cladding layer has approximately the same value as that of the silicon substrate. With a value of $3.6 \times 10^{-6}$ K$^{-1}$ for the thermal coefficient of expansion of the silicon substrate the cladding layer has to have a coefficient of expansion of $3.65 \times 10^{-6}$ K$^{-1}$; K=Kelvin.

Figure 1:
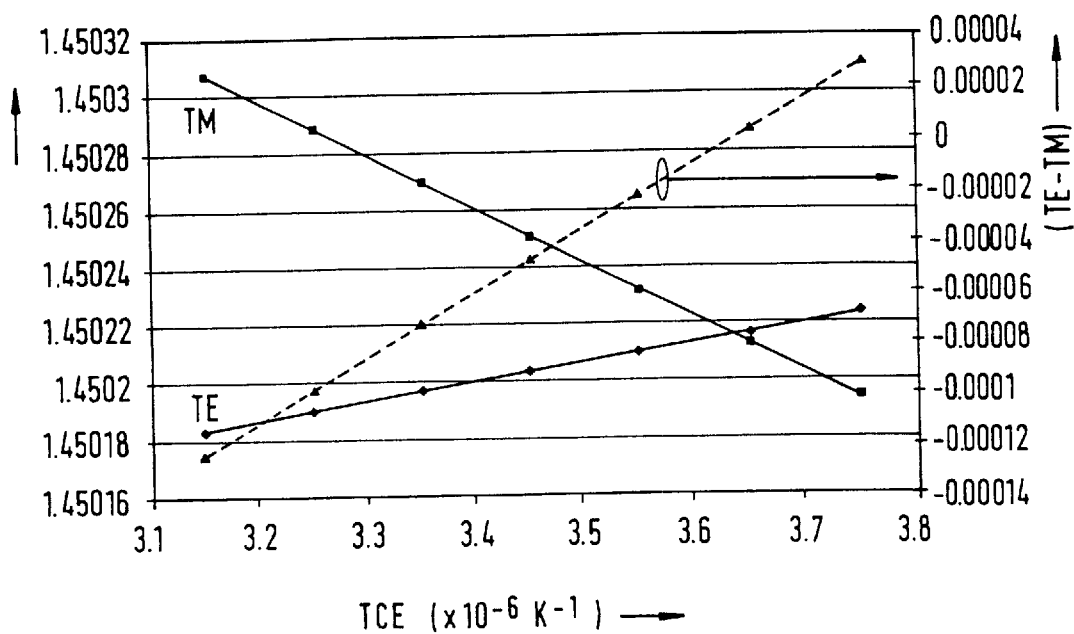
FIG. 1 shows a graph of the effective refractive index for TE- and TM-modes and the resulting birefringence of an optical signal in an optical waveguide produced according to the state of the art as a function of the thermal coefficient of expansion (TCE) of the cladding layer.
Figure 2:
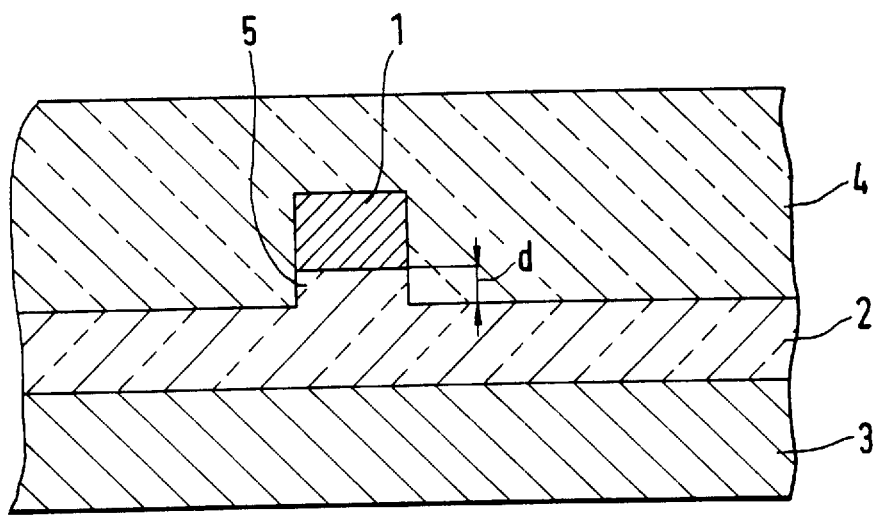
FIG. 2 shows a cross-section of an optical waveguide according to the invention.

FIG. 2 shows an optical waveguide 1 according to the invention of an optical component, such as e.g. a star coupler, directional coupler or arrayed waveguide grating, in cross-section. This optical waveguide 1 is etched in a core layer. This core layer rests on a buffer layer 2 which is itself applied to a silicon substrate 3. Both the waveguide 1 and at least portions of the rest of the buffer layer 2 which are exposed are covered by a cladding layer 4. The cladding layer 4 consists of a vitreous material, preferably silicate ($SiO_2$) which is accordingly doped with dopants. Boron atoms are primarily used in this case in order to increase the thermal coefficient of expansion of the silicate until the optical waveguide 1 according to the invention exhibits birefringence-free properties. Other dopants are optionally used in addition to the boron atoms, such as e.g. phosphorus atoms, in order to be able to adjust the refractive index.

As can be seen in FIG. 2 the optical waveguide 1 according to the invention does not rest directly on a plane face of the buffer layer 2 but on a strip-shaped waveguide base 5 of this buffer layer 2. Accordingly, the optical waveguide 1 according to the invention rests directly on this waveguide base 5 which extends, like the optical waveguide 1, over the entire optical component in the longitudinal direction (not shown in FIG. 2).

This waveguide base 5 of the buffer layer 2 is advantageously produced during etching (for example dry etching) of the optical waveguide 1 from the core layer. The thickness d of this waveguide base 5 can vary as a function of the depth of the etching process applied via the core layer into the buffer layer 2. It has turned out that application of the optical waveguides 1 to strip-shaped waveguide bases 5 of this type leads to the cladding layer 4 covering it requiring a smaller thermal coefficient of expansion for birefringence-free optical waveguides 1. As a result, the quantity of dopants, advantageously boron atoms, can be smaller to arrive at a cladding layer which has the desired thermal coefficient of expansion. The cladding layer 4 completely covers the optical waveguide 1 and the sides of the strip-shaped waveguide base 5.

Figure 3:
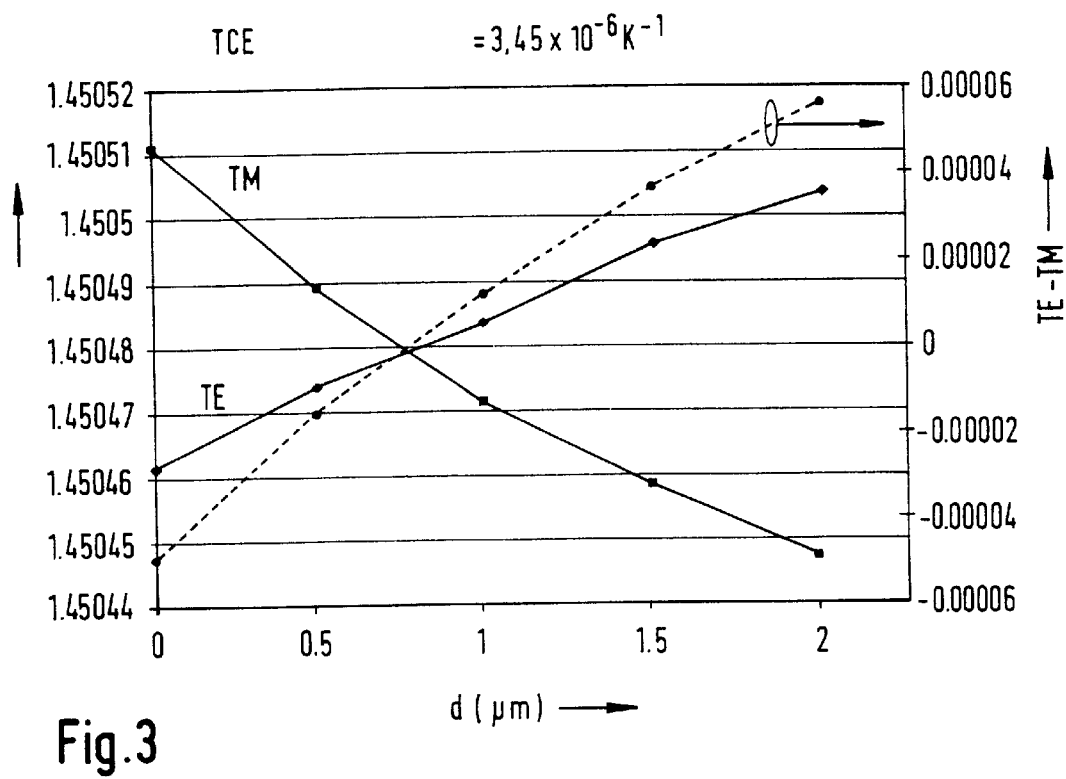
FIG. 3 shows a graph of the effective refractive index of the TE- and TM-modes of an optical signal transmitted in the optical waveguide according to the invention and the resulting birefringence as a function of the thickness of the waveguide base of the buffer layer.

FIG. 3 shows a graph of the effective refractive index of the TE- and TM-modes and the resulting birefringence (given by the subtraction of the effective refractive index of the TE-mode from that of the TM-mode) as a function of the thickness d of the waveguide base 5 from the buffer layer 2 for a thermal coefficient of expansion of the cladding layer 4 of $3.45 \times 10^{-6}$ K$^{-1}$ reduced with respect to that of the silicon substrate ($3.6 \times 10^{-6}$ K$^{-1}$). The graph in FIG. 3 shows that the optical waveguide 1 will exhibit a birefringence-free property if the waveguide base has a thickness of 0.8 $\mu$m.

Figure 4:
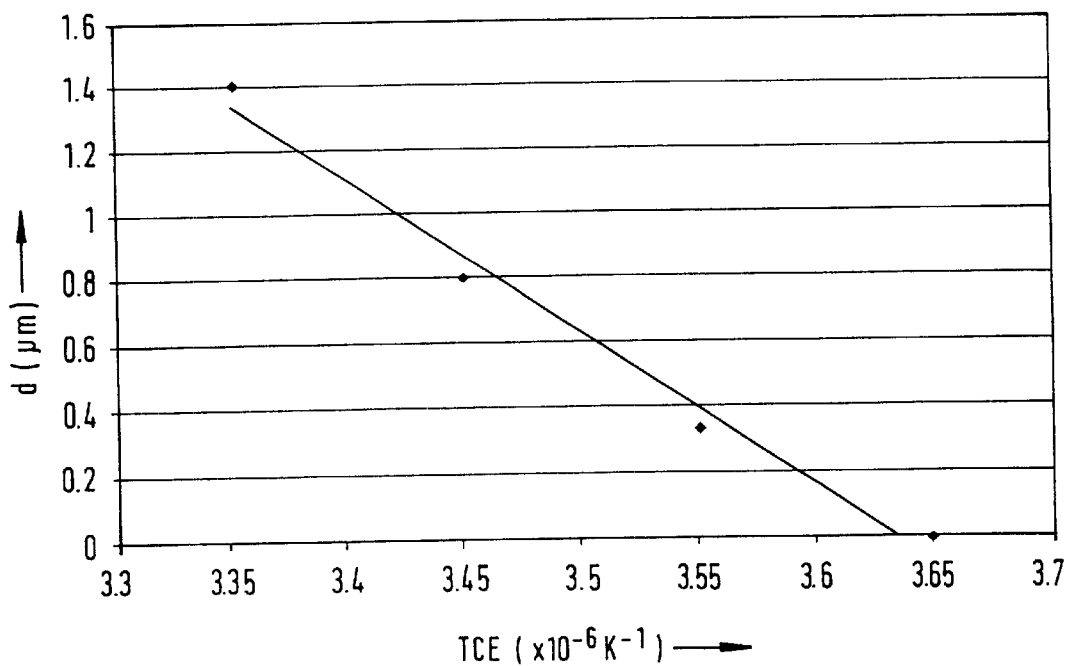
FIG. 4 shows a graph of the thickness of the waveguide base of the buffer layer as a function of the thermal coefficient of expansion (TCE) of the cladding layer of the optical waveguide according to the invention.

It is quite possible to produce birefringence-free optical waveguides with a cladding layer which has an even smaller thermal coefficient of expansion. For example, for a thickness of the waveguide base of 1.1 $\mu$m the optical waveguide 1 located thereon will have birefringence-free properties if the thermal coefficient of expansion of the cladding layer achieves only $3.35 \times 10^{-6}$ K$^{-1}$, as shown in FIG. 4. The thickness of the waveguide base 5 in $\mu$m is shown in a graph in FIG. 4 as a function of the thermal coefficient of expansion of the cladding layer for birefringence-free waveguides, which thickness is scaled by a factor of $10^{-6}$.

Owing to this knowledge about the influence of a waveguide base on the optical waveguide located thereon, a process for producing optical waveguides of this type in optical components such as e.g. star couplers, directional couplers or arrayed waveguide gratings can be selected in which the quantity of foreign atoms (dopants) is selected as a function of the thickness d of the waveguide base 5. In this case, the fewer the number of foreign atoms used, the greater the thickness d of this waveguide base. The thermal coefficient of expansion of the cladding layer is selected in a similar manner as a function of the thickness d of the waveguide base 5. In this case the greater this thickness d, the lower the thermal coefficient of expansion of the cladding layer 4 (in comparison with the thermal coefficient of expansion of the substrate).

The decision to structure optical waveguides on a waveguide base of the buffer layer advantageously facilitates the use of few foreign atoms (dopants) for the cladding layer. Consequently, the great disadvantage of sensitivity to moisture of cladding layers which have been doped, for example, with boron atoms is eliminated. Therefore, optical waveguides, which exhibit a stable birefringence-free property over time, can be successfully produced without additional production steps, such as e.g. an additional protective layer, being required.

In the first embodiment the width of the waveguide base is equal to the width of the waveguide. Alternatively, waveguide and waveguide base can also be of different widths. The different widths can be produced by at least one additional suitable structuring process, for example masking and/or etching. For a waveguide base wider than the waveguide, the waveguide and a partial region of the buffer layer would be covered, for example after structuring of the waveguide, and subsequently the waveguide base would be formed by etching the partial region of the buffer layer not covered.

Figure 5:
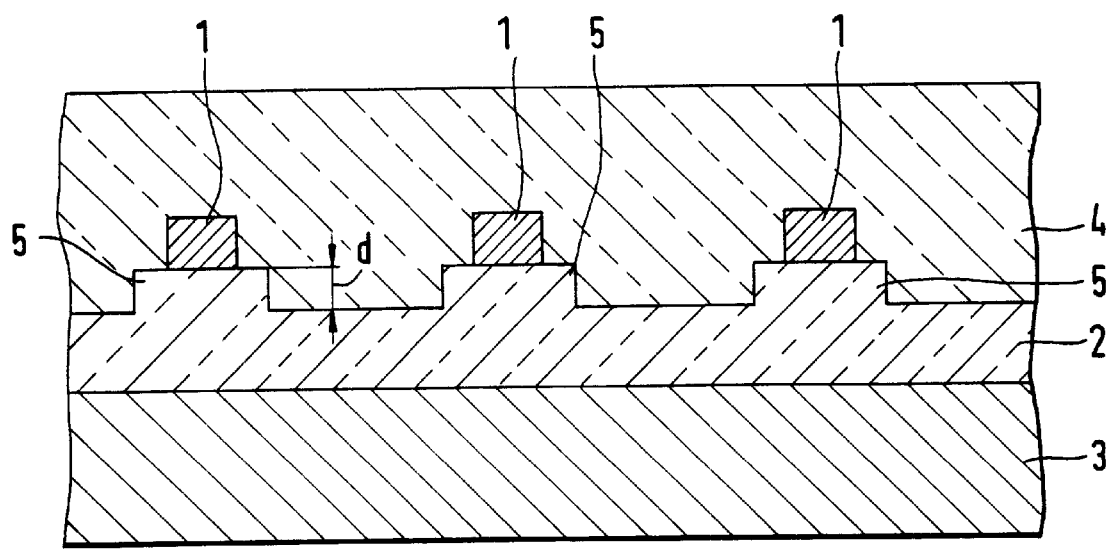
FIG. 5 shows a cross-section of three optical waveguides according to the invention.

The second embodiment will now be described with the aid of FIG. 5. FIG. 5 shows a cross-section of three optical waveguides according to the invention. A buffer layer 2 is applied to a substrate 3. Three waveguide bases 5 are structured on the buffer layer 2, the waveguide bases 5 being formed from the same material as the buffer layer 2. The waveguide bases 5 are produced, for example by etching the buffer layer, the depth of the etching corresponding to the thickness d. The three waveguides 1 are structured on the three waveguide bases. During production, the three waveguides 1 are structured, for example, initially on the buffer layer 2, from which the waveguide bases 5 can then subsequently be formed by covering and etching. The waveguide bases 5 in the second embodiment are wider than the waveguides 1. A cross-section is shown in FIG. 5. In longitudinal direction the waveguides 1 can, for example, extend linearly, in a curved manner, sinusoidally or in another way. These types of waveguides are designated strip-shaped waveguides irrespective of their mode of extension in the longitudinal direction. The widths of the waveguide bases 5 are ideally adapted to the widths of the waveguides 1 in the longitudinal direction. If waveguides 1 and waveguide bases 5 have, for example, the same width and the waveguides 1 extend in a curved manner in the longitudinal direction, then the waveguide bases 5 have a profile in the longitudinal direction adapted to this curved profile. In the case of etching of the waveguide profiles and waveguide base profiles in a structuring step, this curved profile automatically forms so as to be accordingly adapted. Finally, a cladding layer 4 is applied to buffer layer 2, waveguide base 5 and waveguide 1.

In the two embodiments the waveguide base is made of the same material as the buffer layer. Alternatively, the waveguide base can also consist of a different material. The material of the waveguide base is selected such that it does not affect the optical light guidance. Any doped material that has an identical refractive index and a similar softening temperature to the buffer layer can, for example, be used as material. During production a second buffer layer, which serves to form the waveguide base, is then initially structured, for example onto the buffer layer, and subsequently the waveguide layer. The waveguide and the waveguide base are then formed by an etching process in a one-stage or a two-stage process. The one-stage process is used to form a waveguide and a waveguide base with identical widths. The one-stage process is used to form a waveguide and a waveguide base with different widths. Alternatively, only one buffer layer which is suitably doped in the thickness d can be used instead of the second buffer layer. The waveguide base is then formed from the doped region.

What is claimed is:

1. An optical waveguide comprising a core layer disposed on a buffer layer and covered by a cladding layer, the buffer layer disposed on a substrate, wherein a strip-shaped waveguide base of a predetermined thickness is disposed between the buffer layer and the optical waveguide, and exposed side portions of the waveguide base are completely covered by the cladding layer, and the cladding layer comprises a vitreous material doped with foreign atoms, and the predetermined thickness of the strip-shaped waveguide base and the cladding layer together impart a birefringence-free property to the optical waveguide.

2. The optical waveguide according to claim 1, wherein the strip-shaped waveguide base comprises a portion of the buffer layer.

3. The optical waveguide according to claim 1, wherein the strip-shaped waveguide base has the same width as the optical waveguide disposed thereon.

4. The optical waveguide according to claim 1, wherein the predetermined thickness is 0.2 to 2 $\mu$m.

5. The optical waveguide according to claim 1, wherein the cladding layer comprises silicate.

6. The optical waveguide according to claim 1, wherein the cladding layer has boron atoms as foreign atoms.

7. A process for producing an optical waveguide comprising:

forming a buffer layer on a substrate, forming a strip-shaped wave guide base of predetermined thickness on the buffer layer, forming a core layer on the strip-shaped waveguide, wherein the optical waveguide is structured in the core layer, and forming a cladding layer that covers the optical waveguide and exposed side portions of the strip-shaped waveguide.

8. The process for producing an optical waveguide according to claim 7, wherein the cladding layer comprises a vitreous material doped with foreign atoms, and the quantity of foreign atoms is selected as a function of the thickness of the strip-shaped waveguide base, wherein the number of foreign atoms decreases as the thickness of the strip-shaped waveguide base increases.

9. The process for producing an optical waveguide according to claim 7, wherein the thermal coefficient of expansion of the cladding layer is selected as a function of the thickness d of the strip-shaped waveguide base, wherein the thermal coefficient of expansion of the cladding layer decreases as the thickness of the strip-shaped waveguide base increases.

10. The process for producing an optical waveguide comprising:

forming a first buffer layer on a substrate, forming a second buffer layer the first buffer layer and forming the second buffer layer into a strip-shaped waveguide base of predetermined thickness, forming a core layer on the strip-shaped waveguide base, wherein the optical waveguide is structured into the core layer; and forming a cladding layer that covers the optical waveguide and exposed side lateral portions of the strip-shaped waveguide.

11. The optical waveguide according to claim 1, wherein the cladding layer has phosphorus atoms as foreign atoms.

12. The optical waveguide according to claim 1, wherein the predetermined thickness is 0.8 $\mu$m.

13. The process for producing an optical waveguide according to claim 10, wherein the cladding layer comprises a vitreous material doped with foreign atoms, and the quantity of foreign atoms is selected as a function of the thickness of the strip-shaped waveguide base, wherein the number of foreign atoms decreases as the thickness of the strip-shaped waveguide base increases.

14. The process for producing an optical waveguide according to claim 10, wherein the thermal coefficient of expansion of the cladding layer is selected as a function of the thickness d of the strip-shaped waveguide base, wherein the thermal coefficient of expansion of the cladding layer decreases as the thickness of the strip-shaped waveguide base increases.

* * * * *